(12) United States Patent
Kim

(10) Patent No.: US 8,540,108 B2
(45) Date of Patent: Sep. 24, 2013

(54) BOWL HOLDER

(75) Inventor: Jin Won Kim, Los Angeles, CA (US)

(73) Assignee: CJ America, Inc., Los Angeles, CA (US)

( * ) Notice: Subject to any disclaimer, the term of this patent is extended or adjusted under 35 U.S.C. 154(b) by 326 days.

(21) Appl. No.: 12/143,736

(22) Filed: Jun. 20, 2008

(65) Prior Publication Data

US 2009/0314784 A1  Dec. 24, 2009

(51) Int. Cl.
*A47G 19/00* (2006.01)

(52) U.S. Cl.
USPC ............... 220/574.2; 220/592.23; 220/739; 220/661; 62/457.6; 62/457.1

(58) Field of Classification Search
USPC ............ 220/574.2, 592.23, 739, 737, 573.1, 220/592.01, 661; 99/340, 403, 408, 410; 62/457.6, 457.1
See application file for complete search history.

(56) References Cited

U.S. PATENT DOCUMENTS

| | | | |
|---|---|---|---|
| 1,160,939 A * | 11/1915 | Mock .................... | 220/592.23 |
| 1,229,912 A * | 6/1917 | Doncaster .............. | 220/592.23 |
| 3,113,761 A * | 12/1963 | Platzman ............... | 366/115 |
| 3,241,706 A * | 3/1966 | Monaco et al. ........ | 206/558 |
| 3,882,628 A * | 5/1975 | Stouder ................. | 43/55 |
| 3,941,967 A * | 3/1976 | Sumi et al. ............ | 219/729 |
| 3,971,360 A * | 7/1976 | Spoeth, Jr. ............ | 220/495.05 |
| 3,974,354 A * | 8/1976 | Long .................... | 219/729 |
| 3,991,719 A * | 11/1976 | Bruce ................... | 119/61.5 |
| 4,058,214 A * | 11/1977 | Mancuso ............... | 206/545 |
| 4,164,174 A * | 8/1979 | Wallsten ................ | 99/415 |
| 4,316,070 A * | 2/1982 | Prosise et al. ......... | 219/728 |
| 4,323,167 A * | 4/1982 | Zirn et al. ............. | 220/592.23 |
| 4,464,405 A * | 8/1984 | De Christopher ...... | 426/391 |
| 4,716,855 A * | 1/1988 | Andersson et al. ..... | 119/61.54 |
| 5,125,393 A * | 6/1992 | Levitin ................. | 126/376.1 |
| 5,474,206 A * | 12/1995 | Herring, Sr. ........... | 220/636 |
| 5,544,568 A * | 8/1996 | Potgieter .............. | 99/340 |
| 5,549,039 A * | 8/1996 | Ito et al. ............... | 99/340 |
| 5,598,944 A * | 2/1997 | Aragona ............... | 220/575 |
| 5,924,566 A * | 7/1999 | Gibbs ................... | 206/361 |
| 5,979,693 A * | 11/1999 | Bane, III .............. | 220/592.2 |
| 6,588,326 B2 * | 7/2003 | Taplan et al. .......... | 99/422 |
| 7,431,174 B2 * | 10/2008 | Thissen ................ | 220/574.2 |
| 7,527,018 B2 * | 5/2009 | Manley-Hood ........ | 119/61.5 |
| 2004/0262319 A1 * | 12/2004 | Fisher .................. | 220/592.03 |

* cited by examiner

*Primary Examiner* — Mickey Yu
*Assistant Examiner* — Kareen Rush
(74) *Attorney, Agent, or Firm* — Ardent Law Group, P.C.; Anthony King

(57) ABSTRACT

A bowl holder for a bowl adapted for serving a hot meal includes a top structure configured for a removable placement of the bowl into the bowl holder, a bottom plate, and sidewalls disposed between the top structure and the bottom plate near perimeters thereof.

15 Claims, 6 Drawing Sheets

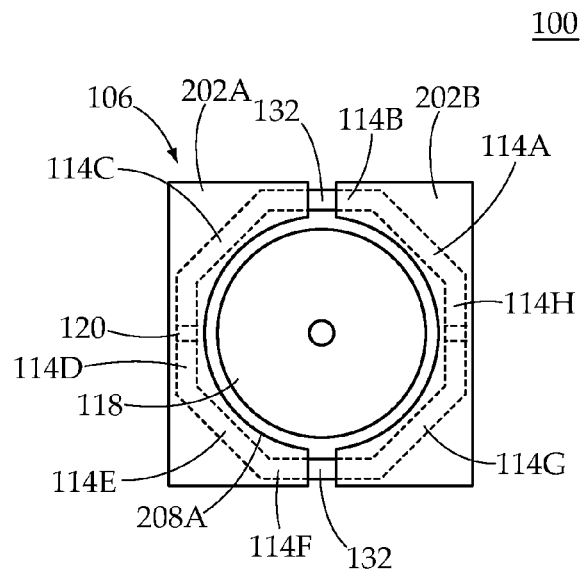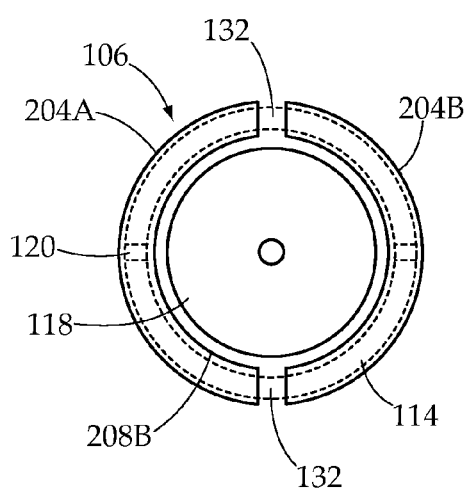
VIEW "A"
(IT. 102 NOT SHOWN)
VIEW "A"
(IT. 102 NOT SHOWN)
FIG. 2A
FIG. 2B

BOWL HOLDER

FIELD OF THE INVENTION

The present invention relates generally to the field of apparatuses for transporting and serving articles of food and, more particularly, to a bowl holder.

BACKGROUND OF THE INVENTION

In business establishments serving cooked meals, the meals are often transported and served in hot bowls, as well as consumed from such bowls by customers. Such bowls are typically used in Asian cultures, where dining on extremely (temperature) hot food is common and desired. Protection of personnel and customers from contacting hot surfaces of the bowls and maintaining a meal in a bowl at desired temperatures represent a challenging task.

SUMMARY OF THE INVENTION

A bowl holder for a bowl adapted for serving, transporting, and/or preparing a hot meal is disclosed. In one embodiment, the bowl holder includes a top structure configured for a removable placement of the bowl into the bowl holder, a bottom plate for supporting the bowl, and sidewalls disposed between the top structure and the bottom plate near perimeters thereof. In operation, the bowl holder protects a customer and personnel serving the meal from contact with hot surfaces of the bowl and allows maintaining the meal at desired temperatures for an extended period of time.

All objects, features and advantages of the present invention will become apparent in the following detailed written description.

The Summary is neither intended nor should it be construed as being representative of the full extent and scope of the present invention, which these and additional aspects will become more readily apparent from the detailed description, particularly when taken together with the appended drawings.

BRIEF DESCRIPTION OF THE DRAWINGS

FIGS. 2A-2B depict bowl holders according to alternate embodiments of the invention.

Figure 1A:
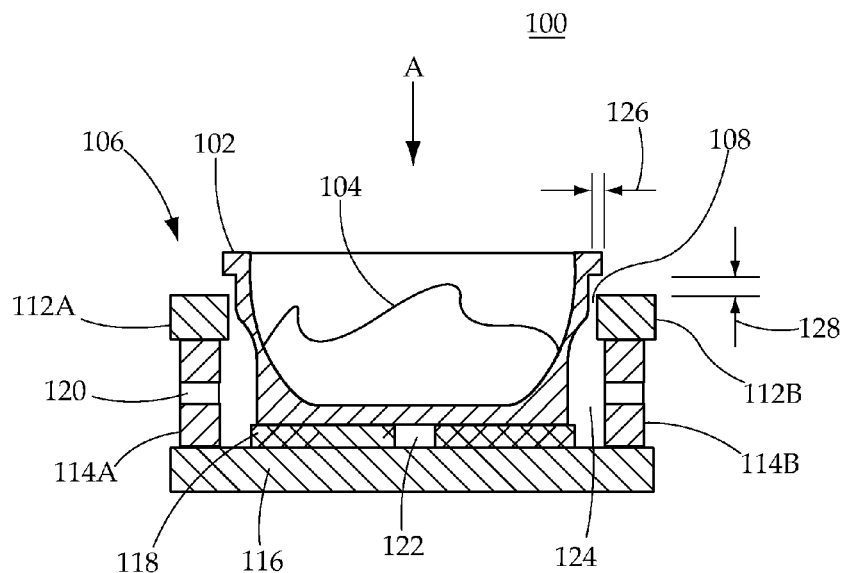
FIGS. 1A-1B depict a bowl holder according to one embodiment of the invention.

The images in the drawings are simplified for illustrative purposes and are not depicted to scale. To facilitate understanding, identical reference numerals are used, where possible, to designate substantially identical elements that are common to the figures, except that suffixes may be added, when appropriate, to differentiate such elements.

It has been contemplated that features or steps of one embodiment may be incorporated in other embodiments of the invention without further recitation.

DETAILED DESCRIPTION

The present invention provides a bowl holder for a bowl adapted for serving, transporting, and/or preparing a hot meal. The invention may advantageously be utilized in restaurants, among other food-processing and/or food-serving establishments.

Figure 1A:
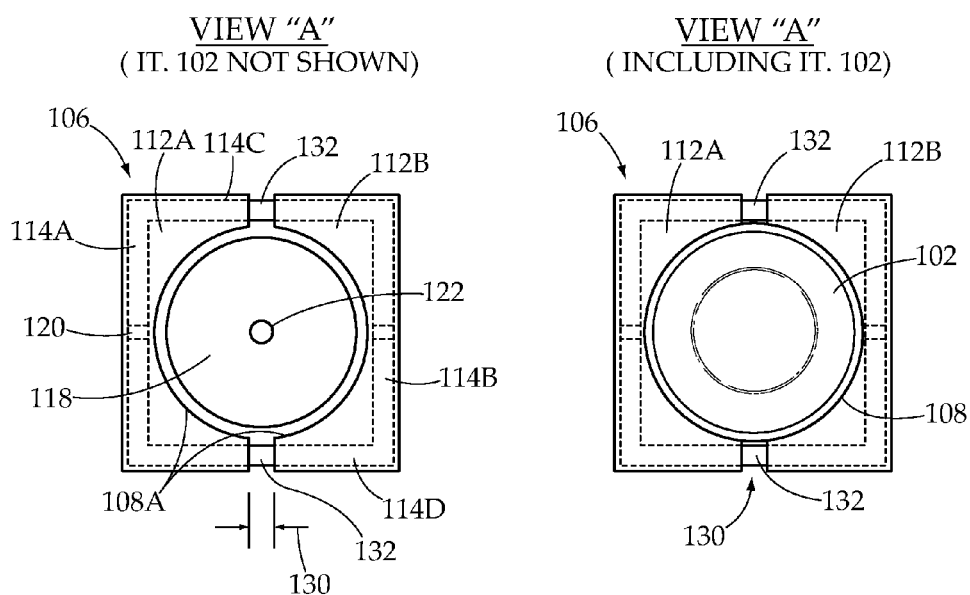

With reference now to the figures, and in particular with reference to FIG. 1, there is depicted a bowl holder 100 according to one embodiment of the invention. The bowl holder 100 generally includes a top structure 106 having a cutout 108, a bottom plate 116, an optional thermo-insulating spacer 118, and sidewalls 114.

Illustratively, the bowl holder 100 is shown with a bowl 102 disposed therein and containing a hot meal 104. The bowl 102 may be fabricated from, for example, stone, clay, ceramic, metal, etc. When the meal 104 is prepared, transported or served, the bowl 104 may occasionally be heated to a temperature that is potentially hazardous to personnel or customers of the respective food-processing or food-serving establishment.

In operation, the bowl holder 100 protects the customers and personnel from a contact with hot surfaces of the bowl 102 and, additionally, allows maintaining the meal 104 at desired temperatures for an extended period of time.

The top structure 106 is configured for a removable placement of the bowl 102 into the bowl holder 100 and defining a lateral position of the bowl. For example, in the cutout 108, the bowl 102 may be disposed with a pre-determined lateral gap 126 to edges of the top structure 106.

In the bowl holder 100, the bowl 102 is placed on the spacer 118 and supported by the bottom plate 116. In one exemplary embodiment, a height of the sidewalls 114 is selected such that a rim of the bowl 102 is disposed at a pre-selected distance 128 from an outer surface of the top structure 106.

In an embodiment shown in FIG. 1A, the top structure 106 includes two substantially identical top plates 112A and 112B. The top plates 112A, 112B are disposed on the sidewalls 114 at a pre-selected lateral distance 130 from each other and, together, define the cutout 108A. In an alternate embodiment (shown in FIG. 1B), the top structure 106 includes a single top plate 112 having a circular cutout (hole) 108B. When two identical top plates 112A, 112B are used and are disposed on the sidewalls 114 at a pre-selected lateral distance 130 from each other, the lateral distance 130 between each plate 112A, 112B forms a recessed opening 132 on each side of the cutout 108A, which may be used for conveniently removing the stone bowl 102 by hand from the holder 100 after the bowl has sufficiently cooled to be touched.

The sidewalls 114 are disposed between the top structure 106 and bottom plate 116 near perimeters thereof and may include one or more optional through openings 120 (two openings 120 are shown). The openings 120 are vents that fluidly interconnect interior (i.e., internal volume 124) and exterior of the bowl holder 100. In a preferred embodiment of the invention, more than two, for example, four or more, optional through openings 120 are used to accelerate the release of heat, a desired effect in cultures less familiar with eating extremely hot food.

Typically, outline dimensions of the top structure 106 and the bottom plate 116 are substantially equal. In one preferred embodiment, the top structure 106 and bottom plate 116 have a form factor of a rectangular (as shown, a form factor of a square), and the sidewalls 114 comprise four linear segments 114A-114D. The sidewalls 114 or component segments thereof may be affixed to the top structure 106 and bottom plate 116 using adhesives and/or hardware, such as nails, screws, clamps, or any combination of the adhesives and hardware.

The top plates 112, bottom plate 116, sidewalls 114, or portions thereof are generally fabricated from thermo-insulating natural or synthetic materials, including wood, bamboo, plywood, chipboard, ceramics, stones, plastics, composites, or a combination thereof. The spacer 118 may generally be fabricated from the same material as the top plates 112, bottom plate 116, and sidewalls 114, or may be comprised of other thermo-insulating material generally known.

In addition, in some embodiments, the spacer 118 is a consumable component of the bowl holder 100 and is replaced with a pre-selected periodicity (for example, every time when the bowl 102 is removed from the bowl holder 100 for cleaning or prior to placing the bowl 102 in the bowl holder 100). In such embodiments, the spacer 118 may also be fabricated from flexible thermo-insulating materials, such a cardboard or rubber, as well as include an optional hole 122 assisting in a removal of the spacer 118.

FIGS. 2A-2B depict bowl holders according to alternate embodiments of the invention. FIG. 2A depicts a preferred embodiment of the bowl holder 100 that comprises the top structure 106 and bottom plate 116 having a form factor of an octagonal. The top structure 106 may include one (as shown) or two top plates 202 and defines a cutout 208A for the bowl 102. Alternatively, another preferred embodiment comprises a square form factor for top structure 106 and bottom plate 116, with eight sidewalls 114A-H forming an octagonal shape in between. This particular embodiment presents added convenience, as it is easier to hold and use the bowl holder 100 with an included heavy bowl 102, because of the additional surface area beneath each of the four corners of a square form factor top structure 106. As such, with this embodiment, there is more top structure 106 available for grabbing with hands. In addition, with this embodiment, eight through openings 120 may be utilized in each of the eight sidewalls 114, thereby allowing greater release of heat from the hot bowl. In yet another embodiment, FIG. 2B depicts the bowl holder 100 comprising the top structure 106 and bottom plate 116 having a form factor of an oval or a circle and, illustratively, including a single top plate 204 defining a cutout 208B for the bowl 102.

Although the present invention herein has been described with reference to particular preferred embodiments thereof, it is to be understood that these embodiments are merely illustrative of the principles and applications of the invention. Therefore, modifications may be made to these embodiments and other arrangements may be devised without departing from the spirit and scope of the invention, which is defined by the appended claims.

Figure 1B:
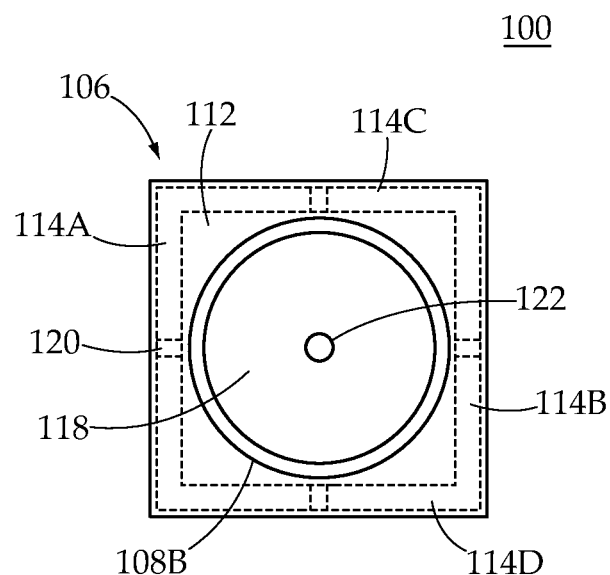
Figure 3:
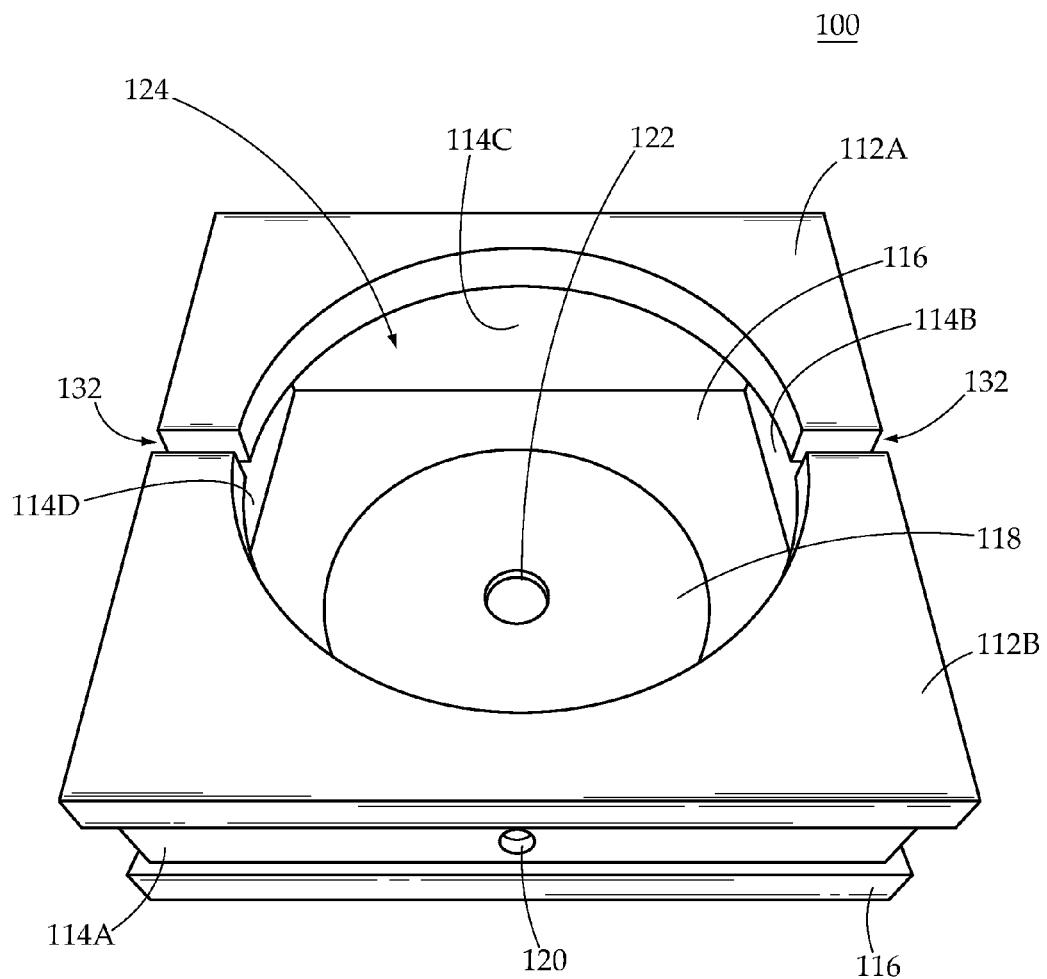
FIG. 3 depicts a perspective view of a bowl holder according to one embodiment of the invention.
Figure 4:
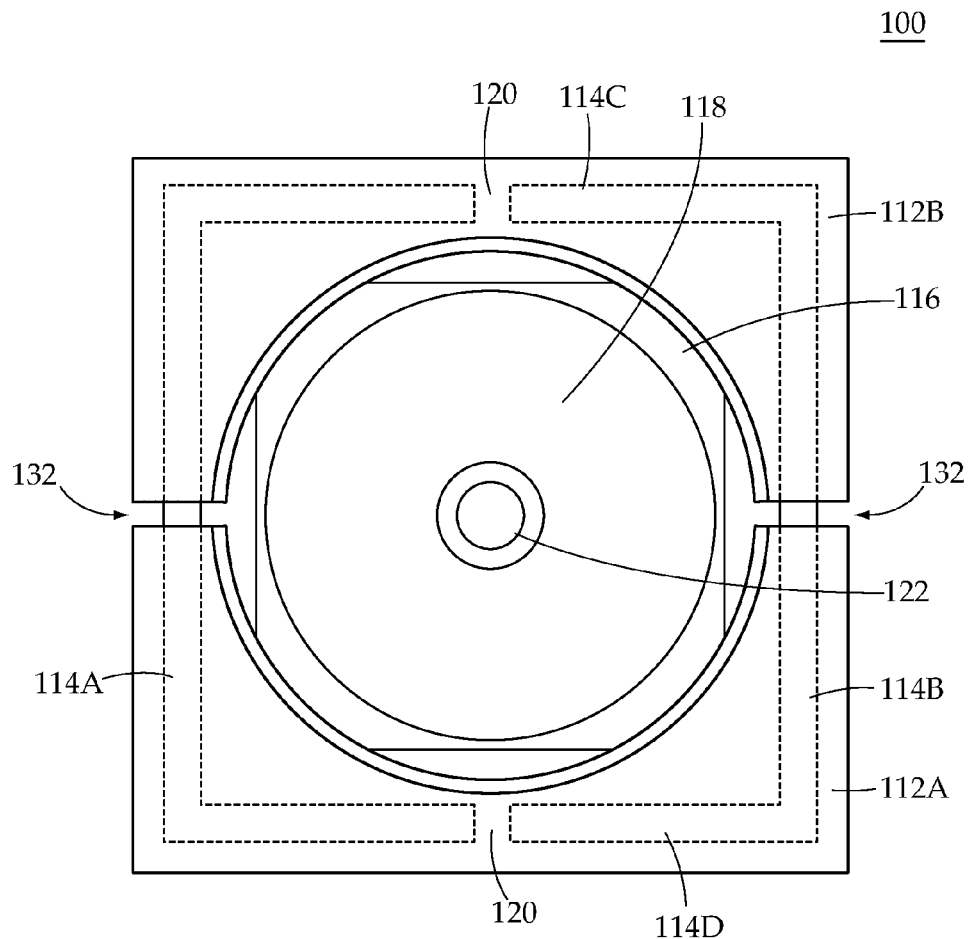
FIG. 4 depicts a top perspective view of a bowl holder according to one embodiment of the invention.

FIGS. 3 and 4 depict three dimensional perspective views of the embodiment of the bowl holder 100 depicted in FIGS. 1A and 1B, wherein the top structure 106 is comprised of two (2) substantially identical top plates 112A and 112B having a form factor of a square, the bottom plate 116 further having a square form factor, and the four (4) linear sidewalls segments 114A-114D further comprising a square shape. Additional features described of the embodiment depicted in FIGS. 1A and 1B are further depicted in FIGS. 3 and 4.

FIGS. 2A-2B depict bowl holders according to alternate embodiments of the invention. FIG. 2A depicts a preferred embodiment of the bowl holder 100 that comprises the top structure 106 and bottom plate 116 having a form factor of a square, with the top structure 106 further comprising two top plates 202A and 202B (as shown) and defines a cutout 208A for the bowl 102. Continuing with the preferred embodiment of FIG. 2A, the bowl holder 100 further comprises eight sidewalls 114A-H forming an octagonal shape in between top plates 112A/112B (top structure 106) and bottom plate 116. This particular embodiment presents added convenience, as it is easier to hold and use the bowl holder 100 with an included heavy bowl 102, because of the additional surface area beneath each of the four corners of a square form factor top structure 106. As such, with this embodiment, there is more top structure 106 available for grabbing with hands. In addition, with this embodiment, eight through openings 120 may be utilized in each of the eight sidewalls 114, thereby allowing greater release of heat from the hot bowl (only two (2) through openings 120 are shown in FIG. 2A).

Figure 5:
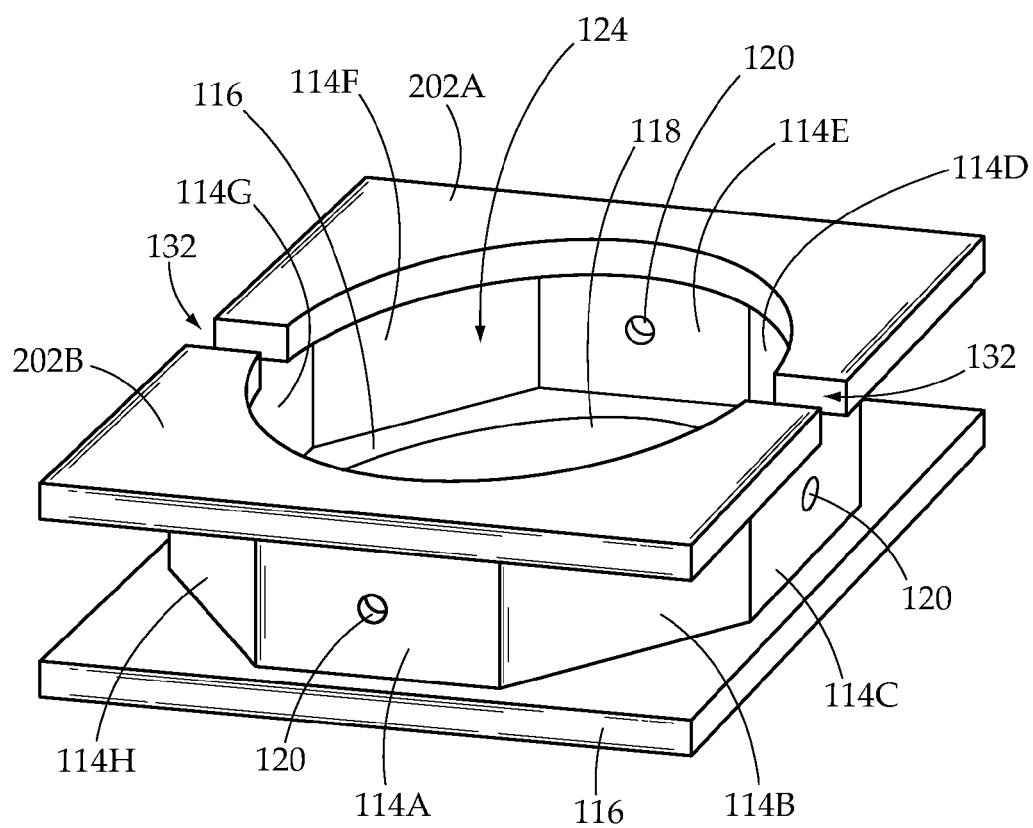
FIG. 5 depicts a perspective view of a bowl holder according to an alternative embodiment of the invention.

FIG. 5 depicts a three dimensional perspective view of the embodiment of FIG. 2A. In this drawing, the preferred embodiment of the bowl holder 100 comprises four (4) through openings 120 (only three (3) through openings 120 are in view). Additional feature described of the embodiment of the bowl holder 100 depicted in FIG. 2A are further depicted in FIG. 5.

In yet another embodiment, FIG. 2B depicts the bowl holder 100 comprising the top structure 106 and bottom plate 116 having a form factor of an oval or a circle and, illustratively, including a single top plate 204 defining a cutout 208B for the bowl 102.

Although the present invention herein has been described with reference to particular preferred embodiments thereof, it is to be understood that these embodiments are merely illustrative of the principles and applications of the invention. Therefore, modifications may be made to these embodiments and other arrangements may be devised without departing from the spirit and scope of the invention, which is defined by the appended claims.

What is claimed is:

1. A food containment system, comprising:
  a bowl;
  a bowl holder, wherein said bowl holder comprises:
    a top flat structure consisting of two substantially identical minor image plates, the two plates forms a circular cutout having a rim, the cutout removably receive the bowl into an interior space of the bowl holder, wherein the rim is disposed away from an outside surface of the bowl by a predetermined lateral distance W when the bowl is received in the bowl holder;
    wherein the two substantially identical minor image plates are disposed away from each other by a distance X;
    a plurality of side walls coupled to the top structure, wherein the top structure has a flat underside that perpendicularly adjoins an inside wall surface of each side wall;
    wherein the closest distance from a center point of each side wall to the rim is distance Y, and the center point of each side wall is defined as a point on a line adjoining said side wall to said top flat structure, equal-distance to both lateral terminal ends of said side wall;
    wherein each of said plurality of side walls has one through hole fluidly interconnecting the interior space of the bowl holder to an exterior of the bowl holder, wherein the one through hole has a diameter no larger than a thickness of the side wall;
    a bottom plate coupled to the plurality of side walls, wherein the plurality of side walls are disposed between said top structure and said bottom plate; and
    the thickness of each side wall is as same as a thickness of each of said plates, and is as same as a thickness of the bottom plate;
  wherein distance W is about ½ the diameter of the through hole, and is less than ½ the distance Y;
  wherein the bowl has a thickness larger than distance W;

wherein the closest distance from the inside wall surface of any of the side walls to the bowl is larger than distance Y; and wherein distance X is larger than the diameter of the through hole.

2. The system of claim 1, wherein an top surface of the top flat structure is disposed below an outer rim of the bowl, when the bowl is received in the bowl holder.

3. The system of claim 2, wherein at least one of the top flat structure and the bottom plate has a form factor of a square, an octagon, or a circle.

4. The system of claim 3, wherein at least the top flat structure is fabricated from a thermo-insulating material.

5. The system of claim 3, wherein at least portions of the top flat structure, the bottom plate, and the side walls are fabricated from wood, plywood, ceramic, stone, plastic, composite, or a combination thereof.

6. The system of claim 5 further comprising a removable thermo-insulating spacer disposed between said bowl and said bottom plate.

7. The system of claim 5, wherein the bowl is made of stone.

8. The system of claim 7, wherein the bowl is to serve a hot meal.

9. The system of claim 7, wherein the bowl is to prepare a hot meal.

10. The system of claim 7, wherein each side wall only has one through hole.

11. A food preparation system comprising:
    a heated stone bowl having a temperature hazardous to touch by a person;
    a thermo-insulating bowl holder to contain the heated stone bowl;
    wherein when the heated stone bowl is contained within the bowl holder, the only portion of the heated stone bowl that makes direct contact with the bowl holder is a bottom portion of the heated stone bowl;
    wherein the bowl holder is comprised of a flat top structure coupled to a plurality of side walls, which couple to a bottom plate, and wherein the plurality of side walls defines a perimeter of the bowl holder's interior space;
    wherein the flat top structure is made of two identical minor image plates, and the two identical mirror image plates are disposed away from each other at a distance X, forming a circular cutout in between the two identical mirror image plates to receive the heated stone bowl, wherein the cutout has a rim smaller than the perimeter of the bowl holder's interior space;
    wherein the heated stone bowl is disposed away from the rim by distance W;
    wherein when the heated stone bowl is received within the bowl holder, an unoccupied and enclosed space S remains within the interior of the bowl holder, wherein the unoccupied and enclosed space S is enclosed by the side walls, the bottom plate, and the flat top structure; and
    wherein the space S at its narrowest section has a width at least twice as long as distance W.

12. The system of claim 11, wherein each of the side walls has a through hole having a diameter larger than distance W; and space S is in fluid communication with an exterior environment only via said through holes and a gap defined by distance W disposed between said heated stone bowl and the rim.

13. The system of claim 12, wherein distance X is longer than said distance W.

14. The system of claim 13, wherein a thickness of the heated stone bowl is larger than distance W.

15. The system of claim 14, wherein the bowl holder has a uniform thickness throughout.

\* \* \* \* \*